Figure 6:
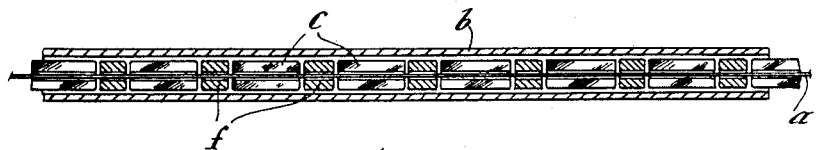

Jan. 17, 1956  A. MATHISEN  2,731,532
TEMPERATURE CHANGE DETECTORS AND METHOD FOR PRODUCING SAME
Filed July 17, 1952  4 Sheets-Sheet 1
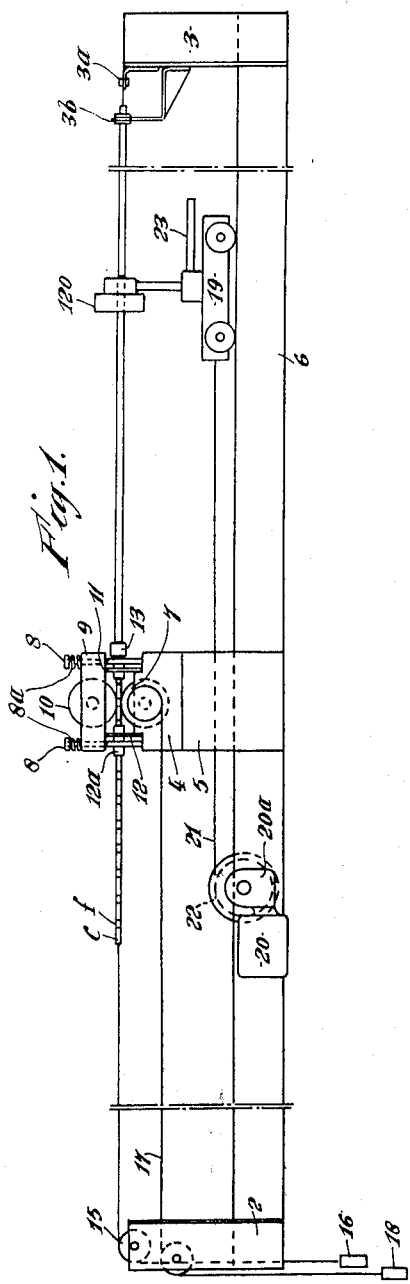
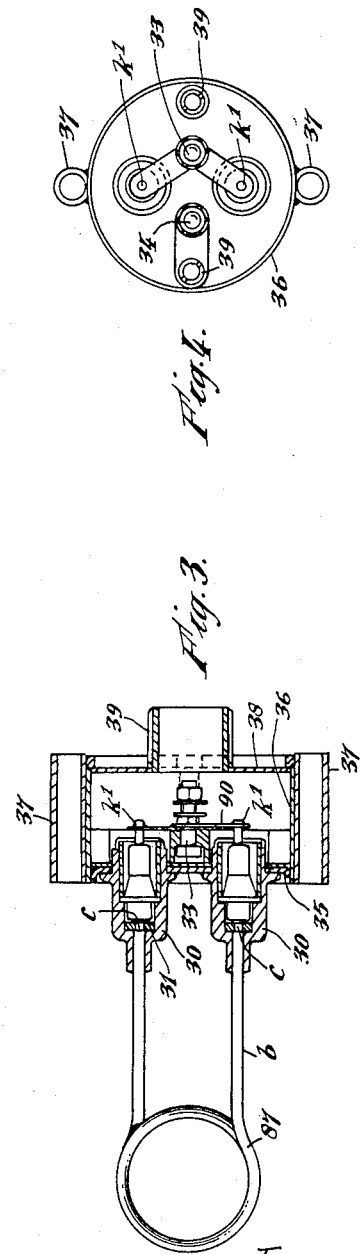
INVENTOR:
ANDERS MATHISEN

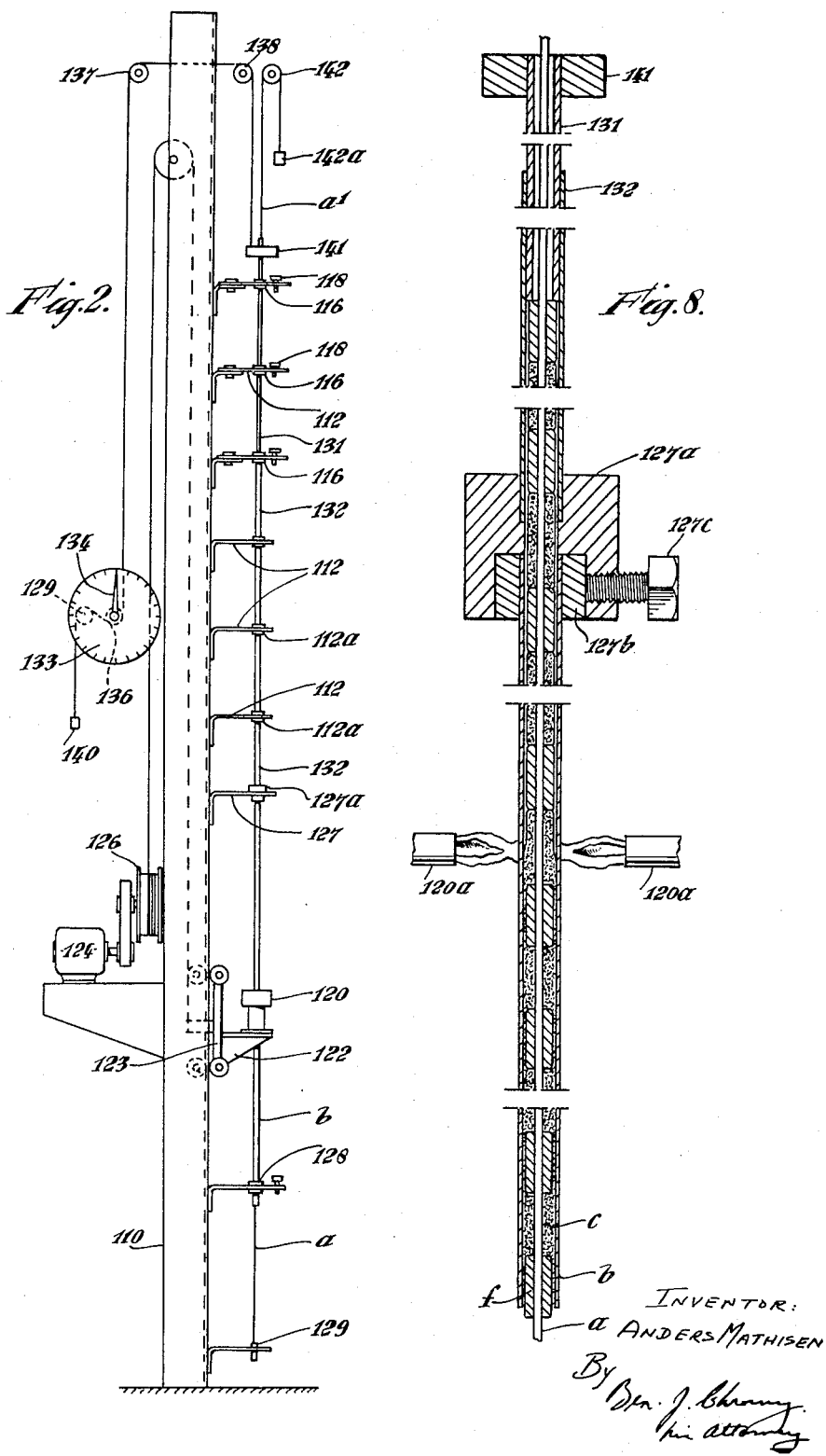

Jan. 17, 1956 A. MATHISEN 2,731,532
TEMPERATURE CHANGE DETECTORS AND METHOD FOR PRODUCING SAME
Filed July 17, 1952 4 Sheets-Sheet 3

INVENTOR:
ANDERS MATHISEN
By
Ben. J. Chron
his attorney

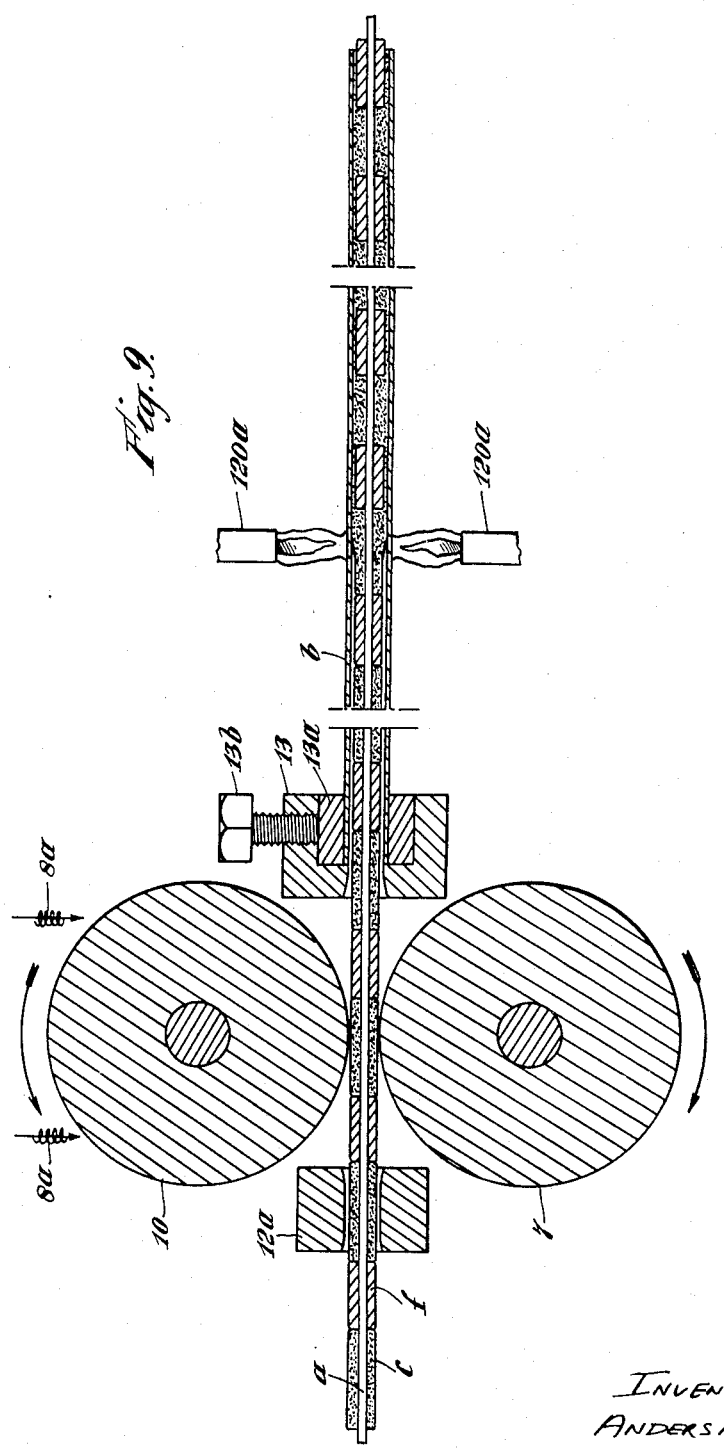

United States Patent Office 2,731,532
Patented Jan. 17, 1956

2,731,532

TEMPERATURE CHANGE DETECTORS AND METHOD FOR PRODUCING SAME

Anders Mathisen, St. James's, London, England, assignor of one-half to Graviner Manufacuring Company Limited, London, England, a British company, and one-half to The Wilkinson Sword Company Limited, London, England, a British company Application July 17, 1952, Serial No. 299,400

Claims priority, application Great Britain August 3, 1951

10 Claims. (Cl. 201—63)

This invention relates to an improved method for producing temperature change or fire and flame detectors, and to detectors produced by said method.

More specifically the invention relates to detectors of the kind comprising an internal conductor usually in the form of a wire surrounded by some material having electric conductivity which varies with temperature change, said material being enclosed within an outer electrical conductor in the form of a metal sheath or tube.

Various pulverulent temperature change responsive materials in the form of metallic salts or oxides have been proposed for use in such detectors but the present invention is confined to materials like glass or glass-like substances which may be non-pulverulent and which are insulating at normal temperature but which when heated to modereate temperature become slightly conducting, the conductivity increasing with increase in temperature.

The preferred temperature change responsive material filling for detectors produced according to the invention are compositions, or mixtures of silicates such as silicates of sodium and calcium with or without additions of various metal oxides and other substances. The material is in the nature of glass composition which softens at a temperature of about 500° C. and may become viscid at temperatures exceeding 1000° C., the materials being workable below this temperature, the condition at normal temperature being hard and brittle and highly electrically insulating, the insulating resistance decreasing as the temperature increases over 100° C. until it becomes practically zero when the filling begins to soften.

More specifically the invention relates to temperature change or fire detectors of the kind comprising an inner electrical conductor surrounded by glass composition material enclosed within an outer electrical conductor, and, according to the invention, the method of producing such a detector comprises the steps of threading glass composition tubing upon said inner conductor, threading said inner conductor and tubing into said outer conductor and then heating the assembly to soften said tubing while applying axial pressure to said tubing to compress this into a tightly fitting filling between said conductors.

The glass composition tubing is preferably provided in short lengths which are interspersed with insulating or like material beads generally (and for convenience herewith referred to as ceramic beads), and, according to one feature of the invention, the method of producing temperature change detectors incorporates the steps of providing glass composition tubing in short lengths, spacing said tube lengths by ceramic beads upon said inner conductor, and after threading this into the outer conductor heating the assembly to soften the glass composition to fill the space between said conductors and to embed the ceramic beads therein.

In greater detail, the method according to the invention of producing temperature change detectors incorporates cleaning said conductors by suitable chemicals, and drying to ensure adhesion of the softened glass composition material, then threading the inner conductor with loose fitting short glass composition tube lengths interspersed with ceramic beads, said conductor, tube lengths and beads being then drawn into the outer conductor in which they are a loose fit to ensure easy movement and encasing by the glass, then securing said conductor at one end, applying axial pressure to said tube lengths and beads along the inner conductor to compress them tightly, applying heat to the assembled conductor near the secured end, moving the heat source along the assembly while continuing to apply pressure to the tube lengths and beads, the heat being sufficient to soften the glass composition tube lengths to cause the material to be forced into intimate contact with the conductors and to embed the ceramic beads therein.

The invention also includes apparatus for producing detectors according to the method of the invention and this apparatus consists in its simplest form in means for mounting said conductors with said glass composition tubing assembled therewith, means for applying pressure to said tubing, and means for applying heat to the assembled detector to cause the glass composition to soften and be compressed within the outer tubing into intimate contact between said conductors.

In more detail, apparatus according to the invention comprises means for mounting said conductors with said glass composition tube lengths and ceramic beads assembled upon the inner conductor, means for applying pressure to the glass tube lengths and beads along the length of the inner conductor, and within said outer conductor, and means for applying heat to the assembled detector to cause the glass to soften and be compressed within the outer conductor, thereby embedding said ceramic beads therein and making intimate contact between the glass and the conductors.

The invention also includes temperature change or fire detectors comprising an inner electrical conductor surrounded by glass composition material enclosed within an outer electrical conductor when produced according to the methods described above.

Preferably the conductors are of a material such as copper or steel, or an iron-nickel-cobalt alloy having approximately the same co-efficient of expansion as a suitably selected glass composition, so that bonding between the glass insulation and conductors takes place during the heating process.

While detectors may be as little as one inch or more in length, generally for use on aircraft power plants they are required to be several feet long and may have to be bent and the like.

Figure 7:
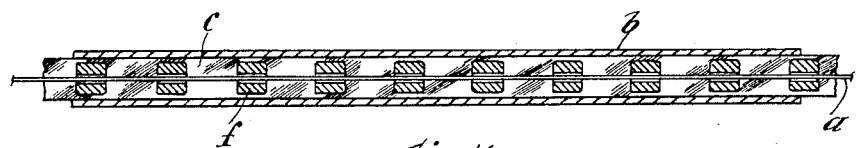
Figure 2A:
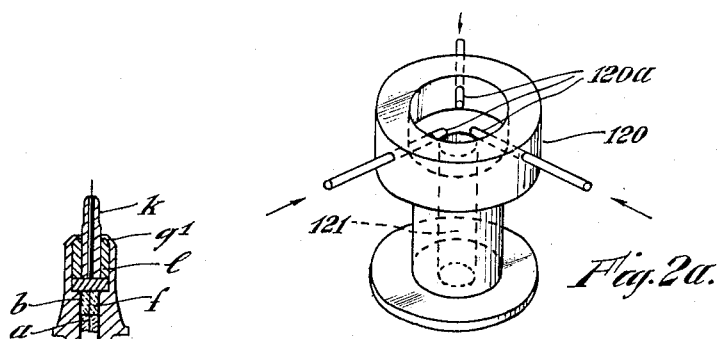
Figure 5:
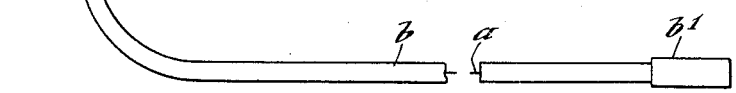

The invention will now be described with reference to the accompanying drawings which shew embodiments of the invention by way of example, and in which:

Figure 1 shews one form of apparatus for producing detectors according to the invention;

Figure 2 shews another form of apparatus and Figure 2a a detail thereof to an enlarged scale;

Figure 3 shews in side view and partial section, a detector made according to the invention, having its ends fitted to an electrical connection device;

Figure 4 is a view of the base of Figure 3 with a cover plate removed;

Figure 5 shews another form of end fitting for a detector made according to the invention;

Figure 6 shews a portion of a detector to an enlarged scale before processing in the apparatus of Figures 1 or 2;

Figure 7 shews a similar view to Figure 6 but after processing;

Figure 8 shews the detector in section to an enlarged scale during the process of production on the apparatus shewn in Figure 2, and Figure 9 shews a detector in section to an enlarged scale during the process of production as shewn in Figure 1.

With a view to facilitating understanding of the invention it will be most convenient to describe the construction of the detector first and referring to Figure 6, $a$ denotes an inner electrical conductor in the form of a wire normally of metal such as copper or steel or some electrical conducting metal alloy, for example of the kind used in electric lamp bulb manufacture and the like, the conductor being, in the latter case, of a character adapted to have glass bonded thereto, $b$ denotes an outer electrical conductor which may be a tube also of copper or steel or of other metal alloy of a kind to which glass will bond, $c$ denotes the glass insulation provided between said conductors. While for some purposes conductors $a$ and $b$ may be used as a fire detector when spaced apart by glass $c$ only, this is not normally satisfactory as the glass may become soft in use and permit contact between the conductors.

According to the prferred method of construction glass $c$ in the form of a tube is broken into short lengths of from ¼" to 1" long which are threaded upon the wire $a$, adjacent tube lengths being spaced by heat resisting beads of material such as quartz or ceramic denoted $f$.

The length of detector shewn in Figure 6 shews the short glass tube lengths spaced by ceramic beads before being processed, and Figure 7 shews the same conductor after processing, whereas Figure 8 shews the detector while being processed. It will be seen from Figure 7 that the glass tube lengths $c$ have melted so as to completely fill the space between conductors $a$ and $b$ embedding beads $f$ in the glass. From Figure 7 it will be seen that the term "embed" is used herein to denote complete encasing of the beads.

Detectors may be of any desired length, 10 to 15 feet or 20 feet are usual for use on aircraft power plants, and as shewn in Figure 5 tube $b$ may be brazed, or otherwise connected to a known type of end fitting denoted $g$, in which a heat resisting insulation disc $h$ is placed over the end of tubing $a$ at a point where a bead $f$ is exposed. Wire $a$ extends through disc $h$ and is secured to a plug pin $k$ which is held by an insulation block $l$ itself held by a turned over rim $g^1$, part of fitting $g$, these parts forming part of a known type of electrical connection device whereby conductors $a$ and $b$ are connected to an associated current supply source and indicating or warning devices. However, the conductors $a$ and $b$ are normally electrically unconnected with each other.

In the manufacture of glass insulated fire and heat detectors the following process or method of production steps and apparatus are adopted.

The conductor wire and tubing are cleaned by chemical means by using degreasing, and dirt and dust and the like removing chemicals and finally drying the conductors.

The glass capillary tube lengths and beads are then threaded on the wire $a$ on which they are a loose fit, the wire, tube lengths and beads being then drawn into the outer conductor tube $b$ in which they are also a loose fit.

It is to be noted that in order to prevent jamming of the glass tube lengths and beads these should be produced with a fair degree of accuracy and should be a loose fit on the wire $a$ and in the outer tube $b$, and should further be reasonably square so as to avoid tilting. At the same time this permits the glass to completely encase the beads.

The wire $a$ extends some feet out of one end of the tube $b$ and about half this extension is fitted with glass tube lengths and beads.

Axial pressure is applied to the glass tube lengths and beads along the wire to tightly compress them thereon, while heat is applied to the assembled detector to cause the glass to soften and to be forced into intimate contact with the conductors while embedding the insulation beads in the glass as shewn in Figure 7.

An apparatus or machine for carrying out the above process step is shown in Figure 1 which shows a horizontal form of apparatus consisting of a frame comprising two pairs 2 and 3 of relatively short uprights of angle section made of a suitable metal, the pairs of uprights being connected in spaced relationship by one or more cross members and two longitudinally extending angle members 6 (one of which is shown connected to one member of each of the two pairs of uprights).

Mounted centrally between the uprights 2 and 3 is a frame structure 4 carried by a pair of uprights 5 secured to member 6. Structure 4 carries roller 7 and four screw threaded studs 8 which by means of a bracket or frame arrangement 9 carries a second roller 10. Rollers 7 and 10 are friction rollers pressed together by springs 8a engaging glass tube lengths $c$ and ceramic spacers $f$, see more particularly Figure 9.

Firmly mounted on the frame 4 is a pair of angle brackets 11 and 12 of which bracket 12 carries a clamping device 13 which by means of a collet 13a and screw bolt 13b clamps one end of conductor $b$, as shewn in Figure 9.

Out of this end of conductor $b$ extends the inner conductor wire $a$ threaded alternately with glass composition tube lengths $c$ and ceramic or quartz spacing beads $f$, these being fed into conductor $b$ by means of the rollers 7 and 10. These tube lengths $c$ and beads $f$ are previously threaded by hand on a central portion of a length of inner conductor wire $a$ one bare end of which is secured to the upright 3 by means of bracket 3a, and the other bare end of which passes over a guide roller 15 carried by upright 2, the end of conductor $a$ being secured to a weight 16 which keeps the conductor taut.

Bracket 12 carries a guide ring 12a which serves to guide glass tube lengths $a$ and ceramic beads $f$ threaded thereon between friction rollers 7 and 10.

The friction rollers 7, 10 are driven by cable 17 fitted at the end with weight 18, cable 17 passing round a reduced section portion of roller 7 as shown in Figure 1, roller 7 driving roller 10 by means of spur wheel or other means not shewn in the drawing.

A trolley 19 is driven by variable speed electric motor 20 fitted with reduction gear 20a and cable 21 which is adapted to be wound on and unwound from drum 22. Gas is supplied to the burner 120 by flexible tube 23 which extends beyond the end of upright member 3 where it passes over rollers, not shown, so as to require a slight tension to draw it along. By means of motor 20 and cable 21, trolley 19 can be traversed to and fro with respect to conductor $b$.

To produce a detector upon the apparatus shown in Figure 1, the conductor $a$ is secured at one end to bracket 3a, the other end passing over roller 15 to weight 16. Conductor $b$ is secured at one end to bracket 3b and at the other end to fixture 13. The glass tube lengths and ceramic beads $f$ have previously been threaded alternately on conductor $a$ and pushed into contact with bracket 3a, a number extending beyond the opposite end of conductor $b$ clamped in fixture 13, the tube lengths and beads passing between rollers 7 and 10 as shown in Figures 1 and 9.

When the conductors $a$ and $b$ with tube lengths $c$ and beads $f$ are positioned as shewn in Figure 1, burner 120 is placed near bracket 3b and lighted, heating the conductors and the glass tube lengths until the glass softens.

As the glass softens, pressure applied by rollers 7 and 10 push additional tube lengths and ceramic beads into tube $b$ and at the same time motor 20 is started to traverse trolley 19, carrying burner 120 along the conductor assembly at a given rate which is just sufficient to ensure that the glass tube lengths melt and fill the space between conductors $a$ and $b$ and completely embed ceramic beads as shewn in Figures 7 and 9.

Glass tube lengths $c$ and beads $f$ may be fed up to rollers 7 and 10 by hand or other means, and the number is so arranged that when burner 120 reaches brackets 11 and 12, the last few tube lengths and beads reach the rollers.

After completion of production, the conductor is taken off the apparatus, a few inches is cut off each end and a conductor length, a portion of which is shewn in Figure 7, is produced and available for fitment with end fittings as shewn in Figure 5.

Referring now to Figure 2 and Figure 8 of the drawings, Figure 2 shews the vertical type of apparatus which consists of a frame comprising two uprights 110 of angle section made of aluminium or aluminium alloy connected together in spaced relationship by cross members, not shewn, the uprights 110 may be of a height of from 20 to 50 feet. Mounted at different levels on one side of the frame is a plurality of guide brackets 112, the spacing between the brackets being about one foot.

These guide brackets comprise slotted bushes 116 secured together to clamp a conductor or other tube by clamping studs 118.

Supported on the frame near the lower end thereof is a three jet gas burner 120, shown separately in Figure 2a, the burner having a through passage 121 located in line with the guide bushes 116. The burner 120 is carried on a platform 122 extending horizontally from a trolley 123 adapted to ride up and down the adjacent edges of the two uprights 110 of the frame, the trolley being driven by an electric motor 124 through a cable 125 which can be wound on and unwound from a drum 126 driven by the motor 124.

Between the lowermost bracket 112 and the burner 120 is a clamping device 127a fixed on a bracket 127.

The apparatus also comprises a pusher tube 131, the function of which will be explained hereafter, a guide tube 132 and an indicator 133, the pointer 134 of which is driven by a cable 135 passing over a wheel 136 fixed on the same shaft as the pointer 134 and over jockey wheels 137, 138 and 139 and having a small cable tensioning weight 140 at one end and a weight 141 at the other end. The weight 141 is apertured centrally and is fixed on the pusher tube 131 and serves to compress the softened glass, see Figure 8.

Before the glass tube lengths and ceramic beads and conductors are processed in the apparatus shewn in Figure 2, they are first assembled on a horizontal table or like surface. To effect this preliminary assembly the glass tube lengths $c$ and ceramic or quartz spacing beads $f$ are alternately threaded by hand on to the inner conductor $a$, and the inner conductor with the glass tube lengths and ceramic beads are then threaded into the outer conductor $b$ as illustrated in Figure 6.

One end of outer conductor $b$ is now secured in a bracket device 128 and one end of inner conductor $a$ is secured to bracket device 129, both the devices 128 and 129 fixed in suitable manner to the base of upright 110; the other end of conductor $b$ is secured to clamping device 127a by a clamping bush 127b held by stud 127c, the burner 120 being disposed thereon as shown in Figure 2 with the gas jets 120a playing thereon as shewn in Figure 8.

Guide tube 132 has the same diameter and bore as the conductor $b$ and is clamped end to end thereto in clamp 127a, the rest of tube 132 being secured in brackets 112 by means of clamping guide devices 112a.

Conductor $a$ passes over pulley 142 and has a weight 142a secured to its end to apply tension to the conductor.

Glass tube lengths and beads are fitted on conductor $b$ from clamp 129 to the top of guide tube 132. Above this is disposed the pusher tube 131 which encircles conductor $a$ and has a diameter enabling it to pass freely into guide tube 132. Pusher tube 131 is provided with weight 141 to which cable 135 is secured as clearly shewn in Figure 8.

To produce a conductor on the apparatus shewn in Figures 2 and 8, burner 120 on bracket 122 carried by trolley 123 is lowered as far down to bracket 128 as possible, and the gas jets 120a connected to flexible tubing are lit to soften the glass tube lengths $c$, these being then in the positions and condition indicated in Figure 6.

The motor 124 is now started into operation with the result that the trolley 123 rides upwards on the frame taking with it the burner 120 which thus moves up over the detector assembly, heating the glass tube lengths, said tube lengths and the ceramic beads moving downwards under the action of the pusher tube 131 loaded by the weight 141, this weight being allowed to fall under gravity by releasing pointer 134 and roller 136. Passage of the weight 141 past the brackets 112 is permitted by successively moving slotted bushes 116 into the open position. The burner in passing over the detector fuses the glass tube lengths $c$ threaded on the inner conductor alternately with the ceramic beads $f$, and the weight 141 acting on the pusher tube 131 forces the tube lengths and beads into the guide tube, compressing the fused glass material yet permitting escape of air from the detector. The axial pressure on the fused glass causes it to embed the beads $f$, and to completely fill the space between the inner and outer conductors, the fused glass being deformed and compacted, and thus pressed into intimate contact with the inner wall of the outer conductor and the outer wall of the inner conductor, in the manner shewn in Figure 8, producing the detector shewn in Figure 7.

Detectors manufactured as described above may be fitted at both ends with end fittings as shewn in Figure 5 or if only one end fitting is required a metal cap $b^1$ may be brazed over the open end to prevent loss of glass if the detector should be overheated in use.

The detector is bendable within a radius of about an inch or two as shewn in Figure 3. In this figure a short length of detector comprising outer conductor $b$ is secured in end fittings by brazing or the like, the glass substance being encircled by an insulating ring 31 where conductor $b$ has been bared off, conductor $a$ being connected to plug pin $k^1$ similar to pin $k$, Figure 5.

Pins $k^1$ are connected by conductor strips 32, connected to insulated terminal 33, another terminal 34 connected electrically to outer conductor $b$ being provided as shewn in Figure 4 by which terminals electric connections to the detector are provided.

The above parts are secured in a metallic housing of known form, comprising top plate 35 welded to ring 36 provided with bolt lugs 37. A base cover plate 38 incorporating cable connection fitting 39 is detachably secured to plate 35 and ring 36 by screw studs 39 (see Figure 4).

The device shewn in Figures 3 and 4 provides a useful point type of fire and temperature change detector in which the electrical connections are insulated from each other.

Detectors produced by the above apparatus may be of any length up to 15 to 20 feet or more but lengths of 5 to 10 feet are of great use in aero engine installations when in the form shewn in Figure 5.

When a length of about 15 feet of such a detector is exposed to heat, for example in an electric oven, and alternating current of approximately 30 volts is applied thereto a temperature alternating current graph is obtained substantially as follows.

Practically no current flows until a temperature of about 150° C. is applied but at 200° C. a current of 25 milli-amperes flows, this increasing to about 100 milli-amperes at 250° C., 300 milli-amperes at 300° C., 1000 milli-amperes or one ampere at 360° C., then rising to constitute a short circuit at 400 to 500° C., that is before the glass melts or becomes very soft.

The above applies to what is commonly known as soft glasses comprising silicate of sodium and calcium which are soft and workable at or below 800° C. to 1000° C. A different graph will be obtained with hard glasses such as those composed of boro-silicates which soften and can be worked at or somewhat below 1000° C. to 1300° C.

It may be pointed out that owing to the polarising effect glass insulated fire or temperature change detectors do not operate satisfactorily upon direct electric current therefore alternating current is used.

What I claim and desire to secure by Letters Patent is:

1. A temperature change detector comprising an inner metallic electrical conductor, a tubular outer metallic electrical conductor enclosing said inner conductor and normally electrically unconnected therewith, beads of refractory material loosely threaded on said inner conductor and spaced apart along the length thereof, and a filling of glass completely occupying the remaining space within the outer conductor, said glass embedding the refractory beads being in intimate contact with the inner surface of the outer conductor and the outer surface of the inner conductor substantially throughout the length of said conductors and having the characteristic of being non-conductive below a predetermined temperature and increasingly conductive above said predetermined temperature, whereby a continuous electrically conductive path may be established from any point on the inner surface of said outer conductor to an adjacent point on the surface of said inner conductor upon heating the detector at said point above said predetermined temperature.

2. A temperature change detector comprising an inner metallic electrical conductor of substantially circular cross-section, a tubular outer metallic electrical conductor normally electrically unconnected with said inner conductor, hollow cylindrical beads of refractory material through which said inner conductor passes, said beads being spaced at intervals throughout the length of said detector and having an internal diameter greater than the diameter of said inner conductor and having an external diameter less than the internal diameter of said outer conductor, and a glass filling embedding said refractory beads and in intimate contact with said inner and outer conductors substantially throughout the length of said conductors, said glass having the characteristic of being non-conductive below a predetermined temperature and increasingly conductive above said predetermined temperature, whereby a continuous electrically conductive path may be established from any point on the inner surface of said outer conductor to an adjacent point on the surface of said inner conductor upon heating the detector at said point above said predetermined temperature.

3. A temperature change detector comprising an inner electrical conductor, a tubular outer electrical conductor enclosing the inner conductor normally electrically unconnected therewith, a continuous glass filling disposed between said inner and outer conductors and having the characteristic of being non-conductive below a predetermined temperature and increasingly conductive above such predetermined temperature, said filling being in intimate contact with the opposing surfaces of said inner and outer conductors, and beads of refractory material loosely threaded on said inner conductor and embedded in said glass filling, said beads being spaced apart at intervals throughout the length of the conductor, whereby a continuous electrically conductive path may be established from any point on the inner surface of said outer conductor to an adjacent point on the surface of said inner conductor upon heating the detector at said point above said predetermined temperature.

4. The method of producing a temperature change detector having an inner electrical conductor surrounded by a glass composition material enclosed within another electrical conductor, temperature changes being indicated by the conductivity of said glass material, comprising the steps of threading glass composition tubing which is non-conductive below a predetermined temperature and increasingly conductive above said predetermined temperature upon a wire conductor, threading said wire conductor and tubing into an outer conductor sheath, and then heating the assembly to soften said composition tubing while applying axial pressure to said composition tubing to de-form the tubing into a tightly fitting filling between said conductors.

5. The method of producing a temperature change detector having an inner electrical conductor surrounded by glass composition material enclosed within another electrical conductor, temperature changes being indicated by the conductivity of said glass material, comprising the steps of alternately threading short lengths of glass tubing and ceramic beads upon a wire conductor, said glass tubing having the characteristic of being non-conductive below a predetermined temperature and increasingly conductive above said predetermined temperature, said ceramic beads having a bore whose transverse dimensions are larger than the transverse dimensions of said wire conductor, threading said wire conductor and the elements threaded thereon into an outer conductor sheath which makes a loose fit with said ceramic beads, heating the assembly to soften said glass tube lengths, and applying axial pressure to the glass tubing and ceramic beads to de-form the said tube lengths thereby causing them to fill the space between said inner and outer conductors and to embed said ceramic beads therein.

6. The method of producing a temperature change detector having an inner electrical conductor surrounded by glass composition material enclosed within another electrical conductor, temperature changes being indicated by the conductivity of said glass material, comprising the steps of cleaning said conductors with suitable chemical cleaning agents, drying the cleaned conductors, alternately threading short lengths of glass tubing and ceramic beads upon a wire conductor, said glass tubing having the characteristic of being non-conductive below a predetermined temperature and increasingly conductive above said predetermined temperature, said ceramic beads having a bore whose transverse dimensions are larger than the transverse dimensions of said wire conductor, drawing said wire conductor with said glass tube lengths and said ceramic beads threaded thereon into an outer conductor sheath making a loose fit with said ceramic beads, securing said conductors at one end, applying a uniform pressure to said tube lengths and beads in a direction towards the secured end of said conductors to compress them tightly, applying heat to the assembled conductors near the secured ends thereof to soften the glass tube lengths, and moving the heat source along the assembled conductors while continuing to apply said uniform pressure to said tube lengths and beads to force the softened glass into intimate contact with said conductors and to embed the ceramic beads therein.

7. A temperature change detector comprising a tubular outer metallic conductor, an inner metallic electrical conductor substantially coaxial with said tubular outer metallic conductor and normally electrically unconnected therewith, a number of hollow cylindrical members of heat-resisting electrically-insulating material spaced at intervals along the length of the detector, each hollow cylindrical member surrounding said inner conductor with the inner surface of said hollow cylindrical member spaced from said inner conductor and with the outer surface of said hollow cylindrical member spaced from the outer conductor, and a glass filling completely occupying the remaining space within the conductor including the space between the inner surface of each hollow cylindrical member and the portion of the inner conductor lying within said member as well as the space between the outer surface of said hollow cylindrical member and the surface of the outer conductor adjacent thereto, said glass having the characteristic of being non-conductive below a predetermined temperature and increasingly conductive above said predetermined temperature, whereby a continuous electrically conductive path may be established from any point on the inner surface of said outer conductor to an adjacent point on the surface of said inner conductor upon heating the detector at said point above said predetermined temperature.

8. The method of producing a temperature change detector, comprising the steps of alternately threading glass tubing and ceramic beads upon a conductive wire, said glass tubing having the characteristic of being non-conductive below a predetermined temperature and increasingly conductive above said predetermined temperature, said ceramic beads having a bore whose transverse dimensions are larger than the transverse dimensions of said wire conductor, passing at least part of the thus threaded wire into an elongated metal sheath which makes a loose fit with said ceramic beads, mounting the sheath with the threaded wire therein in a substantially vertical position, applying heat to the sheath and its contents progressively from the lower to the upper end thereof to fuse the glass, and simultaneously with said heating applying a constant downward pressure to the uppermost member threaded on the wire thereby to move the threaded members progressively down the wire as the glass fuses to embed the beads in the glass and force the glass into intimate contact with both the wire and the sheath.

9. The method of producing a temperature change detector, comprising the steps of threading glass tubing and heat resisting spacer members upon a conductive wire, said glass having the characteristic of being non-conductive below a predetermined temperature and increasingly conductive above said predetermined temperature, said heat resisting members being spaced at predetermined intervals along the wire, passing at least part of the wire with the glass and heat resisting members threaded thereon into a metal tube, mounting the tube with the threaded wire therein in a substantially vertical position, fixing the lower end of the wire relative to the metal tube, heating successive portions of the tube to the fusion temperature of the glass, the heating commencing in the vicinity of the lower end of the wire and progressing upwards, and, simultaneously with said heating, applying a substantially unvarying downward pressure to the uppermost threaded member to move the threaded members situated above the presently heated zone down the wire to surround the spacer members with the glass as it fuses and to force the fused glass into intimate contact with both the wire and the sheath.

10. A temperature change detector in the form of a readily bendable electrical cable comprising an outer electrically conductive tubing element surrounding an inner electrically conductive element normally electrically unconnected therewith, both extending throughout the length of the detector and adapted for bending on a relatively small radius of curvature, a thermo-sensitive non-pulverulent substantially continuous glass filling co-extensive with said outer and inner elements and in intimate contact with said elements throughout their length, said filling being non-conductive below a predetermined temperature and increasingly conductive above said predetermined temperature, and spacer elements of refractory material embedded in said glass filling between said inner and outer elements and spaced apart at intervals throughout the length of the detector, whereby said detector may be subjected to bending without substantially altering its operating characteristics.

References Cited in the file of this patent
UNITED STATES PATENTS

| | | |
|---|---|---|
| 1,359,400 | Lightfoot | Nov. 16, 1920 |
| 1,588,558 | Thornton | June 15, 1926 |
| 2,216,375 | Minter | Oct. 1, 1940 |
| 2,413,125 | Walbridge | Dec. 24, 1946 |
| 2,477,348 | Postal | July 26, 1949 |
| 2,594,921 | Hansard | Apr. 29, 1952 |